United States Patent [19]

Dibelius et al.

[11] Patent Number: 4,475,343

[45] Date of Patent: Oct. 9, 1984

[54] METHOD FOR THE GENERATION OF HEAT USING A HEAT PUMP, PARTICULARLY FOR PROCESSES RUN ONLY AT HIGH TEMPERATURES

[75] Inventors: Günther Dibelius; Reinhold Pitt, both of Aachen, Fed. Rep. of Germany

[73] Assignee: Bercwerksverband GmbH, Essen, Fed. Rep. of Germany

[21] Appl. No.: 263,464

[22] Filed: May 13, 1981

[30] Foreign Application Priority Data

May 14, 1980 [DE] Fed. Rep. of Germany ....... 3018450

[51] Int. Cl.³ .................... F01K 23/02; F01K 27/00
[52] U.S. Cl. ........................................ 60/648; 60/655; 60/682; 237/2 B; 237/12.1
[58] Field of Search ................. 60/643, 645, 650, 682, 60/648, 655; 237/2 B, 12.1; 62/238.6

[56] References Cited

U.S. PATENT DOCUMENTS 3,498,072 3/1970 Stiefel ................................. 62/238.6

OTHER PUBLICATIONS

*Engineering Thermodynamics,* by Jones and Hawkins; John Wiley & Sons, New York: 1963 pp. 628, 629 and 624–625.

*Primary Examiner*—Allen M. Ostrager
*Attorney, Agent, or Firm*—Michael J. Striker

[57] ABSTRACT

In a method for the generation of heat using a heat pump in which a heat carrier fluid is heated by a heat exchanger and compressed with temperature increase in a subsequent compressor, heat is delivered therefrom to a heat-admitting process; the fluid is then expanded in a gas turbine, producing work, and afterwards its residual heat is delivered to a thermal power process, the maximum temperature of the energy sources of which, that provide work for the compressor, lies below the temperature of heat delivery. The main heat source can consist of an exothermic chemical or nuclear reaction and the heat-admitting process can be a coal gasification process. The work in the compressor is furnished essentially by the gas turbine and the thermal power process.

8 Claims, 2 Drawing Figures

METHOD FOR THE GENERATION OF HEAT USING A HEAT PUMP, PARTICULARLY FOR PROCESSES RUN ONLY AT HIGH TEMPERATURES

BACKGROUND OF THE INVENTION

The subject of the invention is a method in which the transport of heat occurs from a heat source with limited maximum temperature to a heat consumer (heat-admitting process) operating at even higher temperature by means of a mostly gaseous heat carrier (heat carrier fluid), preferably led in circulation.

Preliminarily, several concepts must be distinguished:

(1) Gas Turbine Concept

The concept "gas turbine" is generally used not only for a turbine in which a gaseous work fluid expands and delivers work, but also for a motor which consists of compressor, heater or combustion-chamber and turbine. Throughout this specification, the first definition will be used.

(2) Gas Turbine-Power Process

The process occurring in the second type of "gas turbine" is characterized in that the work fluid will be heated to a high temperature between the compressor and turbine by introduction of heat from externally (closed process) or through burning of fuel in a combustion-chamber ("internal combustion engine"). Since the temperature—and thereby the volume—of the work fluid is greater with the expansion than with the compression, the work furnished by the turbine is greater than the work received by the compressor: altogether the power machine "gas turbine" delivers work externally. This effective work is greater the higher the turbine—and the lower the compressor—entry temperature. In the case of the closed processes the work fluid must be re-cooled after the expansion before entry again into the compressor. In the case of the open processes the exhaust gas will be led away after the expansion into the environment, and the compressor will suck in fresh air: The "re-cooling" is accomplished in the atmosphere. The power machine process is thus composed of the steps: compression (in the compressor), introduction of heat (in the heater or furnace), expansion (in the turbine), leading away of heat (in the cooler or into the atmosphere).

(3) Cold Gas-Cold Process

With this process the gaseous work fluid flows through the compressor and turbine components in the same succession as with the power machine process. However, heat will not be introduced between these components, but rather removed, and thereby the temperature will be lowered before the expansion. After the expansion, thus at the exit of the turbine, the work fluid has a lower temperature than it had upon entry to the compressor. Heat must thus be introduced into it before the renewed entry into the condensor. Since this process will be used at temperatures below the temperature of the surroundings, one speaks of the heat transferred to the work fluid at the lowest process temperature as being "the produced cold" and the process as being a "cold process".

Since with this process the temperature is higher with the compression than with the expansion, the compressor work is greater than the turbine work; the process must therefore have work introduced from externally.

(4) Heat Pump

In a heat pump in principle the same process takes place, with the same order of succession of compressor, heat withdrawal, expansion, heat admission as in the cold gas-cold process. It is thus a work-receiving process. It is distinguished only with respect to three points:

The heat admission occurs at environmental temperature and by no means goes below this temperature. The useful heat delivered by the pump is accordingly at higher temperature (heating temperature). Lower and upper temperature levels are thus higher than with the cold gas-cold process. Moreover, heat pump processes in customary manner are managed with circulating fluid which vaporizes during heat admission and condenses during heat emission, thus effecting phase changes twice during each cycle. This is not the case with the other described processes.

For the most part a throttle will be used for the expansion, since the process involves temperature levels which do not allow for recovery of a portion of the work of compression through the work-producing expansion; in addition, complications result in turbine expansion of an almost boiling fluid.

(5) High Temperature Heat Pump

The high temperature heat pump process is so named since with the addition of work the temperature of the circulating fluid is raised in the compressor the same as in a heat pump process. However, the high temperature heat pump process operates in a much higher temperature range. Also, the temperature is still sufficiently high after the discharge of heat to the heat-admitting process for recovery of a portion of the work employed in the compression by means of the expansion. In addition, after the expansion the temperature is still sufficiently high to transmit heat into a thermal power process. The circulating fluid remains in the gaseous phase. The primary purpose of the high temperature heat pump is to bring this gas to a higher temperature without the introduction of heat from external sources.

In many cases the temperature on the one hand which can be delivered with the heat from a heat source is upwardly limited (e.g. with chemical or nuclear reaction or through the hot strength of the material for the heat exchanger); on the other hand, it is often the case for a heat consumer that the temperature with which the heat will be introduced is of greatest significance (e.g. with coal gasification processes or with endothermic chemical reactions). Such an upward temperature limitation has for the heat consumer the disadvantage that the rate of reaction of the heat-admitting reaction will be inhibited. Then, either the reactor for this reaction must be built larger, or a decrease in performance must be accepted. One therefore strives to raise the temperature of the heat-admitting reaction, which, however—as will subsequently be demonstrated—is not very easy. It is customary to transport heat from a heat-source to a heat-consumer using a gaseous heat carrier, since heat-source and heat-consumer must be separated from one another. The local separation can thus be essentially chemical, industrial processing or based upon other grounds. The heat carrier can be used once, or, introduced in circulation, repeatedly. The losses of heat occurring with the heat transfer from the heat source to the heat carrier and from the heat carrier to the heat consumer, as well as with the transport of heat itself, result in an introduction of heat into the heat consumer at a lower temperature than that of the heat source. The loss of pressure occurring with the transport of heat is balanced through the use of blowers.

A further problem existing with such high temperature processes, in which e.g. a chemical product is produced, such as gas from coal, is that the heat carrier, after delivery of heat in the high temperature process, still has relatively high temperature, which, on efficiency grounds, must be downwardly cooled. This may be done e.g. during generation of electrical energy. In such cases the yield of chemical products of the heat-admitting reaction and the yield of electrical energy from the entire process are thus coupled with each other. This coupling has disadvantages for the operation of the entire installation when chemical products and electrical energy are not consumed simultaneously in accordance with their production.

It is now known that with the compression of gases their temperature increases, and that work must be expended in order to compress them. It is further known that this work of compression can be performed by a gas turbine, which will be loaded with the same fluid as the compressor. It is conclusively known that in a heat pump process the temperature of the heat carrier gas will be lowered through removal of heat between the compressor and the gas turbine; thereby the gas temperature at the outlet of the gas turbine is lower than the compressor entry temperature. Since the work of the gas turbine alone is not sufficient to drive the compressor, work must be introduced to the compressor-turbine-set. (German Offenlegungsschrift DE-OS 27 55 092). With such heat pump processes the work to be performed in the compressor must, however, be furnished in a relatively uneconomical manner, namely from an energy source which works at a much higher temperature level than is obtained by the heat pump itself; moreover, the final temperature obtained, as is well known, corresponding to the previously considered significant entry zone, is relatively low.

SUMMARY OF THE INVENTION

The invention is therefore based upon the problem of eliminating the described disadvantages from a method of the above-described type; in particular the present invention aims at the expedient use of energy remaining in the heat carrier fluid, after the delivery of heat in high temperature processes, within the same process, in order to diminish the portion of coupled products in the entire production or to eliminate them completely; and finally, the delivery of heat should be made possible at a higher temperature compared to the one upwardly limited of the heat source—for the execution of—high temperature processes without further transfer of heat from particular energy sources.

These objectives will be attained through the characteristic features according to the present invention. In contrast to the usual heat pump processes, the highest obtained usable temperature of work fluid in the entire process will be reached by the heat carrier fluid before the delivery of heat; this does not mean, however, that a possible further introduced "residual work" for propulsion of the compressor must likewise be included in this temperature limitation.

In most cases it is of particular advantage to select the heat carrier fluid itself as the fluid, from which energy for the propulsion of the compressor is taken.

Preferably the heat carrier (heat carrier fluid), heated to a temperature from the heat source which is upwardly limited by the temperature of heat delivery, will be compressed in a compressor added subsequent to the heat source, which increases the temperature further. Thereupon, the heat is delivered to a heat-admitting process and the cooled-down heat carrier then expanded in a gas turbine, whereupon after extraction of work from the residual heat contained in the heat carrier in a thermal power process, the carrier is introduced again to the heat source. In this manner it is possible to offer processes at a previously unobtainable temperature level, without having to supply the driving energy for the thereby used heat pump at a similarly comparably high level. The invention is thus concerned with a completely new concept, characterized e.g. as "high temperature heat pump" in which the useful temperature collectively found in the process will be obtained only from the heat carrier fluid—before the delivery of heat. The efficiency is particularly high, since heat will be made available with a desired peak temperature from a comparatively inferior energy source—with regard to the relatively low temperature—with small transformation loss, and will be transferred to a high temperature process having a very good efficiency. With the measures according to the present invention one obtains in particular the aspired for decrease of the "coupled products"-flow, and the efficiency of the entire system is increased.

A preferred form of execution for the invention resides in the following features: The heat source, upwardly limited by the temperature of heat delivery, is composed of an exothermic chemical or nuclear reaction and furthermore, the heat-admitting process is a coal gasification process. The heat-carrier should have a temperature before the heat delivery of between about 800° and 1000° C.

Through compression of the gaseous heat carrier, already heated by the admission of heat from the heat source, these temperatures are obtained. After the delivery of heat to the heat consumer at higher temperature from the gaseous heat carrier, the pressure of the gaseous heat carrier will again be lowered, e.g. in an expansion turbine, to the original value. With the turbine expansion the heat carrier delivers work. It is related to the compression work to the extent of the absolute temperature after and before the delivery of heat into the heat consumer and is moreover still dependent upon the pressure ratio of the compressor and the expansion turbine, upon their efficiency, and upon the type of heat carrier. According to the present invention, in this manner a portion—under certain circumstances even a substantial portion—of the necessary work for propulsion of the compressor, would be furnished from the expansion turbine subsequently added in the heat carrier circulation of the heat-admitting process.

According to a further development of the invention, the expansion of the heat carrier fluid after the delivery of heat can thus thereby follow completely or in part, in which case the residual heat may be delivered to a thermal power process. Preferably though, the relaxation ensues chiefly in a gas turbine which occurs after the delivery of heat.

According to the present invention a portion—under certain circumstances even a substantial portion—or, in connection with what has been previously stated, only the residual portion, of the necessary work for propulsion of the compressor would be provided from a thermal power process, added in the heat carrier circulation subsequently to the heat-admitting process and the expansion turbine, e.g. a steam power process. By "residual portion of the work" is understood the work which is not already provided from the expansion turbine, admitted to the heat carrier itself as work fluid.

According to another particular form of execution the compressor, the expansion turbine and a part of the expansion stages (power stages) of the thermal power process subsequently added to the expansion turbine in the heat carrier circulation—e.g. a steam power process—are disposed upon one shaft, and the steam mass flow and steam change of state are so adjusted that the group of machines is, without additional propulsion, in work equilibrium. This has the advantage of an improved efficiency and makes possible a free choice of the speed of rotation of the shaft.

According to still another particular embodiment, the thermal power process is a super-critical vapor power process, i.e. the residual heat of the heat carrier will be introduced to the work fluid used in this process at pressures that are greater than the critical pressure of the work fluid. In this manner the heat-temperature profile of the heat-delivering heat carrier and the heat-admitting work fluid can be better adjusted to each other than with sub-critical pressure in the work fluid, whereby the loss of work capacity (exergy) with the heat transfer is decreased. This can be done with vapor, e.g. with any apt steam. According to a further particular embodiment, together with multiple-loop execution of the heat carrier circulator expansion in the vapor power process follows in a collecting pipe from within a combined middle- and/or low-pressure part, which drives a generator.

If necessary, the high-pressure part of the thermal power process, or—with execution of the method according to the present invention in a plant managed with several parallel heat-carrier circuits—at least some of the high-pressure parts will be provided with separate vapor to start up from a standstill.

Partial-load operation may be adjusted by conducting a partial stream of the heat carrier through loop passages in the expansion turbine and/or past other parts of the installation. Partial-load operation can also be adjusted by lowering the base pressure in the heat carrier circulation and thereby reducing the circulating mass stream ("pressure level control").

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
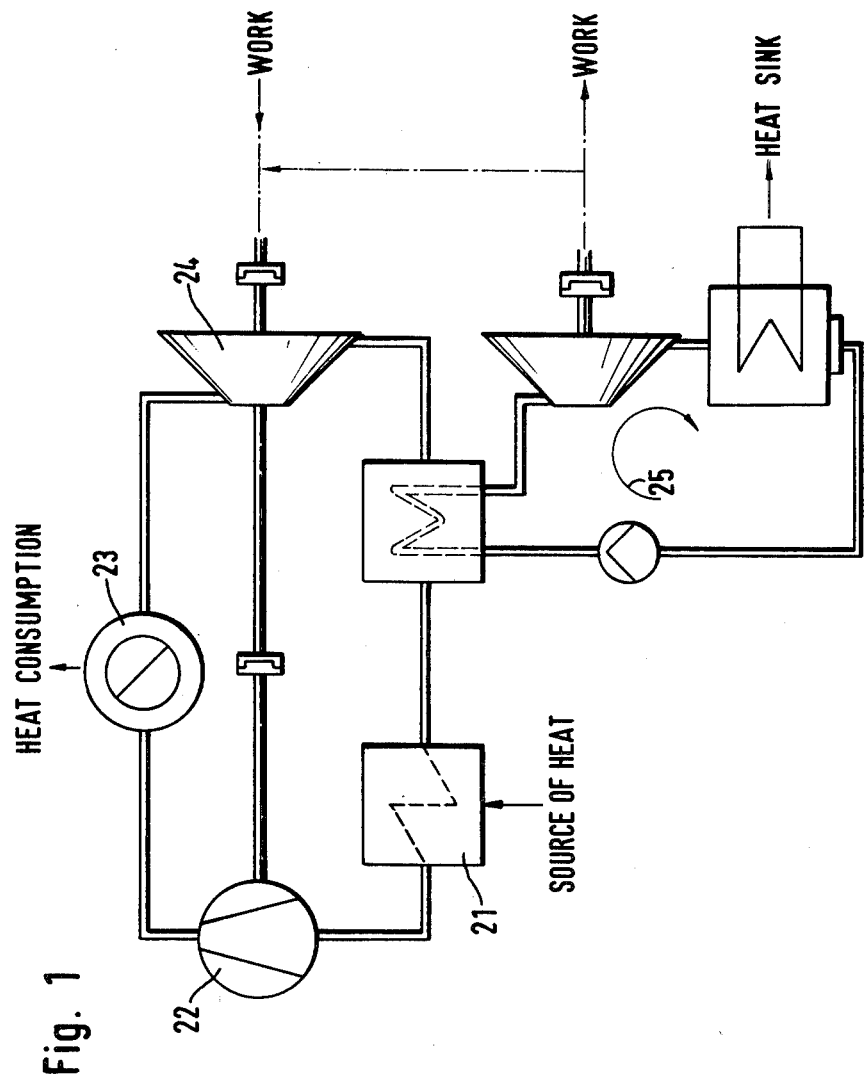
FIG. 1 is a flow diagram of a closed heat carrier circuit with heat source, high temperature compressor, heat consumer, expansion turbine and thermal power process.

As shown in FIG. 1, heat will be transferred from the heat source to a gaseous heat carrier in heat exchanger 21. With compression of the gaseous heat carrier in high temperature compressor 22, the temperature and the pressure of the heat carrier will be increased by introduction of work. In heat exchanger 23 the heat will be conveyed from the heat carrier to the heat consuming process.

In expansion turbine 24 the pressure of the heat carrier, previously increased in high temperature compressor 22, will be lowered almost to its original value along with the delivery of work.

The available heat still in the gaseous heat carrier after exit from expansion turbine 24 will be used in a second heat-consuming process 25, preferably a thermal power process. The temperature of the heat carrier is thereby lowered to the original value. The heat carrier will be introduced anew to heat exchanger 21, whereby the heat carrier circulation is completed. As already described, work is expended for propulsion of the high temperature compressor—expansion turbine set. This can be furnished by the thermal power process 25. Through appropriate laying out of the entire process one can obtain a situation in which on the whole no more work is discharged or introduced.

A particularly favored embodiment is represented in Example 2 and described as follows:

In primary circuit 1 a helium-cooled high temperature reactor 2 will transfer heat in heat exchanger 3 to helium, which is the heat carrier in secondary circuit 4. The heat carrier fluid, heated in such manner to a limited temperature, will then be compressed in compressor 5, and its temperature raised further. In a gasification apparatus 6 coal will be gasified upon addition of steam for gasification and fluidization. The gasification occurs in a fluidized bed; the heat required for the reaction of the coal with the steam will be withdrawn from the heat carrier helium, which flows through an immersion-heater-like bundle of pipes plunged into the fluidized bed and is thereby cooled down.

The gasification and fluidization steam will be superheated in steam superheater 7, before it enters gasification apparatus 6. The heat necessary for the superheating will be transferred from the heat carrier helium to the steam. The helium will then be expanded in expansion turbine 8 to a pressure which, because of the pressure loss in subsequent steam generator 9, in mentioned heat exchanger 3 and in the connected conduits, is greater than the pressure upon entry to compressor 5.

On account of the delivery of heat to gasification apparatus 6 and process steam superheater 7, the temperature of the helium upon entry to the expansion turbine 8 is so greatly reduced that its work alone is not sufficient to drive compressor 5. The remaining work necessary will be provided by steam turbine 10, which is run by steam from the previously mentioned steam generator 9. In addition, its steam will introduce for utilization (not noted in FIG. 2) sensible heat of the crude gas obtained in gasifier 6 and heat, that is liberated with the chemical reaction (methanization) of the gases obtained in gasifier 6.

Near the outlet of steam turbine 10 a partial stream of the steam will be branched off; this stream, for gasification and fluidization, flows to superheater 7.

The remaining steam portion is further expanded in medium pressure- and low pressure-turbine 11 to the condenser pressure, thereby providing work for propulsion of generator 12. The condensation- and the feedwater-systems are not represented in FIG. 2, since known method steps are used for these purposes. Also not displayed is the necessary feed of additional water for adjustment of the steam-mass balance.

With multiple line ("multiple loop") execution of the connected circulation 4, the number of apparatus parts 3, 5, 7, 8, 9 and 10 corresponds to the number of lines. The association of one or several gasification apparatuses 6 to the lines follows according to a technical weighing and efficiency point of view. The apparatus parts 11 and 12 can also in these cases be laid out as individual apparatus and machines.

Figure 2:
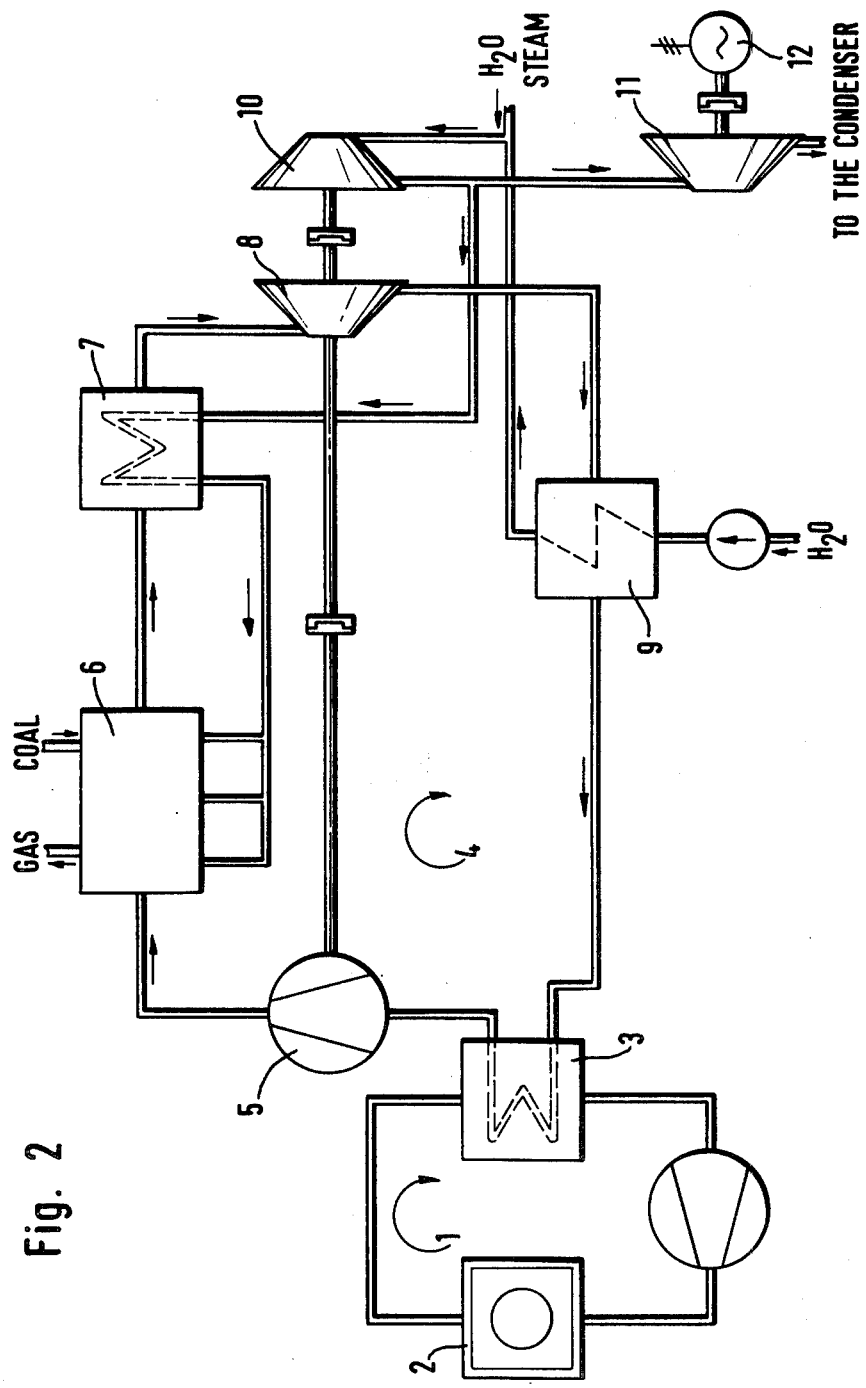
FIG. 2 is a flow diagram of a closed heat carrier circuit with a high temperature nuclear reactor as heat source and a steam-coal-gasification process as heat consumer within the scope of a general view of the present invention.

The following pressures, temperatures, mass flows and work were determined analytically for an operational example of the process represented in FIG. 2:

| PRIMARY CIRCULATION 1 IN HIGH TEMPERATURE REACTOR 2 | | |
|---|---|---|
| Fluid | Helium | |
| Temperature/Pressure | before the reactor ca. | 300° C./ca. 40 bar |
| | after the reactor ca. | 960° C./ca. 40 bar |
| Heat | ca. | 3000 MW |
| Mass flow | 875 | kg/s |
| HEAT EXCHANGER 3 | | |
| fluid | helium/helium | |
| temperature/pressure | primary side in ca. | 950° C./39.9 bar |
| | primary side out ca. | 290° C./39.3 bar |
| | secondary side in ca. | 240° C./43.5 bar |
| | secondary side out ca. | 900° C./41.9 bar |
| number of units | 6 | |
| SECONDARY CIRCULATION 4 | | |
| fluid | helium | |
| 6 lines, each with two gasification apparatus per line | | |
| mass flow | per line 145.8 kg/s; | total 875 kg/s |
| COMPRESSOR | | |
| fluid | helium | |
| temperature/pressure | upon entry | 900° C./41.9 bar |
| | upon exit | 1,000° C./49.8 bar |
| Power at the coupling | per unit 77.3 MW; | total 463.8 MW |
| GASIFICATION APPARATUS 6 | | |
| Fluid | helium/fluidized coal-steam-gas mixture | |
| temperature/pressure | helium side in | 1,000° C./49.8 bar |
| | helium side out | 860° C//49.4 bar |
| | steam side in | 850° C./48 bar |
| | fluidized bed side | 845° C./43 bar |
| | gas side out | 845° C./43 bar |
| Mass flow | coal per gasification unit | 10.93 kg/s |
| | total | 131.2 kg/s |
| | process steam per unit | 53.46 kg/s |
| | total | 641.5 kg/s |
| | crude gas per gasification unit | 80.5 m$_n^3$/s |
| | total | 965.6 m$_n^3$/s |
| Heat | withdrawn from He per gasification unit | 53.2 MW |
| | total | 638.6 MW |
| PROCESS STEAM SUPERHEATER 7 | | |
| Fluid | helium/steam | |
| temperature/pressure | helium side in | 859.5° C./49.35 bar |
| | helium side out | 715.1° C./48.84 bar |
| | steam side in | 415.0° C./52 bar |
| | steam side out | 849.5° C./50 bar |
| Steam mass flow | per line | 106.9 kg/s |
| | total | 641.5 kg/s |
| Heat | (withdrawn from He) per line | 109.5 MW |
| | total | 656.9 MW |
| EXPANSION TURBINE 8 | | |
| Fluid | helium | |
| Tempature/pressure | upon entry | 715.1° C./48.84 bar |
| | upon exit | 681.4° C./44.15 bar |
| Mass flow | per unit | 145.8 kg/s |
| | total | 875 kg/s |
| Power | (in the coupling) per unit | 25.1 MW |
| | total | 150.4 MW |
| STEAM GENERATOR 9 | | |
| Fluid | helium/steam | |
| temperature/pressure | helium side in | 681.2° C./44.15 bar |
| | helium side out | 240° C./43.55 bar |
| | steam side in | 167.9° C./125 bar |
| | steam side out | 540° C./115 bar |
| Steam mass flow | per unit | 121.9 kg/s |
| | total | 731.15 kg/s |
| Capacity | per unit | 334.3 MW |
| | total | 2,005.5 MW |
| HP-STEAM TURBINE 10 | | |
| Fluid | steam | |
| Temperature/pressure | upon entry | 540° C./115 bar |

| PRIMARY CIRCULATION 1 IN HIGH TEMPERATURE REACTOR 2 | | |
|---|---|---|
| | bleed at | 415° C./52 bar |
| | upon exit | 372° C./38.48 bar |
| Mass flow | per line | 200.75 kg/s |
| | total | 1,204.5 kg/s |
| | bleed per line | 106.92 kg/s |
| | bleed total | 641.52 kg/s |
| Power | per line | 52.24 MW |
| | total | 313.4 MW |
| MP-LP STEAM STURBINE 11 AND GENERATOR 12 | | |
| Fluid | steam | |
| Temperature/pressure | upon entry | 372° C./38.44 bar |
| | first bleed and feed of steam for utilization of the crude gas and chemical reaction heat at | 4.89 bar |
| | second bleed at | 1.0 bar |
| | upon exit x = 0.88/0.1 bar | |
| Mass flow | entry up to first bleed | 536.4 kg/s |
| | tapping/junction point up to second bleed | 845.4 kg/s |
| | second bleed | 845.5 kg/s |
| Power | Generator 12 | 588.3 MW |

POWER BALANCE SHEET

(1) ELECTRICAL WORK

| | | |
|---|---|---|
| Generator 12 | | 588.3 MW |
| therefrom: | | |
| condensate pumps | 0.84 MW | |
| feed pump | 13.29 MW | |
| internal consumption HTR | 92.7 MW | |
| internal consumption gas plant | 60 MW | |
| internal consumption steam plant | 40 MW | |
| | 206.83 MW | −206.83 MW |
| | net power | 381.47 MW |

(2) GAS PRODUCTION

| | |
|---|---|
| Crude gas mass flow after drying, cleaning and chemical reaction (methanization) | 965.6 $m_n^3$/s |
| Substitue National gas (SNG)-flow | 111.6 $m_n^3$/s |
| SNG-energy flow ($H_o$ = MJ/kmol) | 4431.3 MW |

(3) COAL EMPLOYED

| | |
|---|---|
| mass flow | 131.2 kg/s |
| coal energy flow ($H_o$ = 28.7 MJ/kg) | 3765.4 MW |

(4) NUCLEAR ENERGY

| | |
|---|---|
| Reactor Heat | 3,000 MW |

(5) DEGREE OF CONVERSION $$\frac{\text{SNG} - \text{energy} + \text{electrical power}}{\text{reactor heat} + \text{coal energy}} = 71.1\%$$

It will be understood that each of the elements described above, or two or more together, may also find a useful application in other types of systems differing from the types described above.

While the invention has been illustrated and described as embodied in a method for the generation of heat using a heat pump, particularly for processes run only at high temperatures, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In a method for the deliverance of heat by means of a heat pump of the type wherein a heat carrier fluid is heated by a heat source; said heat carrier fluid is compressed with temperature elevation in a compressor subsequent to the heat source; heat is delivered from said heat carrier fluid to a heat-admitting process (heat delivery); and said heat carrier fluid is allowed to expand in a gas turbine furnishing a part of the compression energy, the improvement wherein said heat carrier fluid has a temperature of more than about 800° C. before said heat delivery and is delivered to a heat-admitting process running only at temperatures above about 800° C. with a satisfactory rate of reaction, and work collectively provided to drive the compressor, as far as not being furnished by said gas turbine, is furnished mainly by the thermal energy of the always gaseous heat carrier fluid which is still available after the heat delivery in that said heat carrier fluid delivers said thermal energy to a thermal power process which furnishes work to drive said compressor, with or without some of the heat energy which can be delivered by said heat-admitting process and which is available at a temperature below the temperature of said heat delivery.

2. Method according to claim 1, wherein said heat source is an exothermic chemical or nuclear reaction.

3. Method according to claim 1, wherein said heat-admitting process is a coal gasification process.

4. Method according to claim 1, wherein the compressor, the gas turbine, and a part of the expansion stages (power stages) of said thermal power process are disposed one shaft and are in work-equilibrium without additional propulsion.

5. Method according to claim 4, wherein residual expansion follows in a vapor power process in a vapor collecting pipe from within a combined middle- and/or low-pressure part, which drives the generator.

6. Method according to claim 1, wherein said thermal power process is a super-critical vapor power process.

7. Method according to claim 1, wherein said thermal power process is provided with a high pressure part supplied with separate vapor for start-up.

8. Method according to claim 1, wherein a partial-load operation of one or more of the apparatus parts is adjusted through passage of at least a part of said heat carrier fluid.

* * * * *